G. M. RILEY.
PNEUMATIC TRANSMISSION OPERATING DEVICE.
APPLICATION FILED SEPT. 29, 1916.
1,242,474. Patented Oct. 9, 1917.
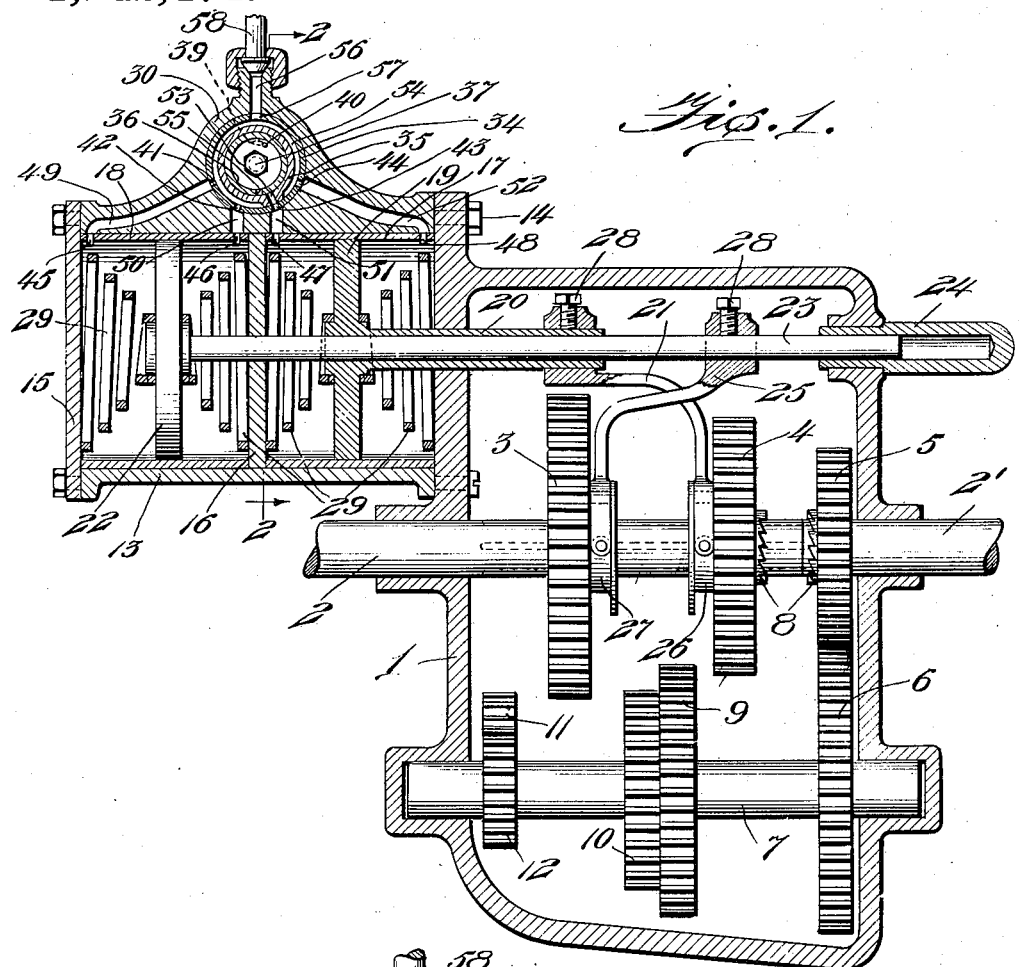

UNITED STATES PATENT OFFICE.

GEORGE M. RILEY, OF AURORA, ILLINOIS.

PNEUMATIC TRANSMISSION-OPERATING DEVICE.

1,242,474.  Specification of Letters Patent.  Patented Oct. 9, 1917.

Application filed September 29, 1916. Serial No. 122,883.

*To all whom it may concern:*

Be it known that I, GEORGE M. RILEY, a citizen of the United States, residing at Aurora, in the county of Kane and State of Illinois, have invented a new and useful Pneumatic Transmission-Operating Device, of which the following is a specification.

The present invention appertains to devices for operating or controlling transmission gearing or simple mechanism, and it is the object of the invention to provide a novel and improved pneumatically operated device of that character.

The invention has for a further object, the provision of a pneumatic transmission operating device comprising a novel assemblage of the component elements, to enhance the utility and efficiency of the device, the device having pressure fluid operated pistons for operating the transmission mechanism, and novel means for controlling the flow of pressure fluid for operating the pistons.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a median section of the device, portions being illustrated in elevation.

Fig. 2 is an enlarged section on the line 2—2 of Fig. 1.

In the drawing, there is illustrated a conventional transmission gearing, it being understood that the present device can be used for operating various transmission mechanisms, and the transmission gearing will be described briefly to assist in the understanding of the utility of the present device. There is provided a suitable casing 1 for inclosing the transmission gears, and a driven shaft 2 journaled through one side of the casing 1 in alinement with a driving shaft 2' journaled through the opposite side of the casing. The transmission gearing as illustrated is for use upon an automobile or motor vehicle, although it can be used elsewhere, for changing the speed of rotation of the driven shaft or element 2 with respect to the driving shaft or element 2'. Gear wheels 3 and 4 are feathered upon the shaft 2, and a gear wheel 5 is keyed upon the shaft 2' within the casing 1, the gear wheel 5 meshing with a gear 6 secured upon a counter shaft 7 journaled within the casing. The gear wheels 4 and 5 have coöperating clutch hubs 8 whereby when the gear wheel 4 is moved adjacent to the gear wheel 5, the shafts 2 and 2' will be connected directly to provide for high speed. A gear wheel 9 secured upon the shaft 7 is adapted to have the gear wheel 4 mesh therewith, the gear wheel being normally between the gear wheels 5 and 9, and when moved in one direction meshing with the gear wheel 9, and when moved in the other direction bringing the clutch hubs 8 into engagement. The gear wheels 4 and 9 in meshing provide for intermediate speed. A gear wheel 10 is also secured upon the shaft 7 and a gear wheel 11 meshes with a gear wheel 12 upon said shaft, the gear wheel 3 being normally between the gear wheels 10 and 11 and being adapted to mesh with one or the other of them when shifted upon the shaft 2. When the gear wheel 3 meshes with the gear wheel 10, this provides for low speed, and when the gear wheel 3 is moved into mesh with the gear wheel 11, this provides for reverse speed.

The present device embodies a cylinder 13 having one open end bolted or otherwise attached, as at 14, to one side of the casing 1, said side of the casing providing a head for the respective end of the cylinder 13, and a head 15 is bolted to the other open end of the cylinder. A disk-shaped partition 16 is fitted within the cylinder 13 between its ends, and bushings or sleeves 17 and 18 are pressed into the cylinder and their adjacent ends abut against the partition 16 to hold it in place. The other end of the bushing 17 bears against the casing 1, and the other end of the bushing 18 bears against the head 15, whereby the bushings and partition are held firmly in place between the ends of the cylinder, and provide a double cylinder, since each bushing or sleeve 17 and 18 provides a cylinder in alinement with the other.

A piston 19 is slidable within the bushing 17 and has a tubular piston rod or stem 20 slidable through the respective side wall of the casing 1 and projecting into said casing, a bracket 21 being secured upon the end of the stem 20. A second piston 22 is slidable within the bushing 18 and has a piston rod or stem 23 passing slidably through the partition 16 and tubular stem 20. The stem 23 is mounted in the stem 20 and its end fits slidably in a tubular guide 24 secured to that side wall of the casing 1 remote from the cylinder 13. A bracket 25 crossing the bracket 21 is secured to the stem 23, and the brackets 21 and 25 are connected by the respective swivel joints 26 and 27 with the gear wheels 4 and 3, whereby said gear wheels can rotate with respect to the brackets but are shifted longitudinally with the brackets when the stems 20 and 23 are slid. The pistons 19 and 22 are held in intermediate positions to hold the gear wheels 3 and 4 in intermediate positions as seen in Fig. 1, and for this purpose, spiral expansion springs 29 are disposed within the bushings 17 and 18 and have their smaller ends bearing against opposite sides of the pistons and the larger ends of the springs bear against the partition 16 and heads of the cylinder. The tension between the springs of each pair is thus neutralized to hold the respective piston in intermediate position. The brackets 21 and 25 are preferably secured upon the stems 20 and 23, respectively, by the set screws 28, although other suitable means can be used.

As a means for controlling the flow of pressure fluid, which may be steam, compressed air, or the like, the cylinder 13 is formed with a transverse cylindrical valve casing 30 between its ends and the ends of the valve casing are closed by the detachable heads or covers 31 and 32. The cover 32 has a central port 33 communicating with the atmosphere and providing an exhaust port for the pressure fluid. A bushing or sleeve 34 is pressed into the valve casing 30 and its ends abut against the covers 31 and 32. A cup-shaped valve 35 is fitted rotatably in the bushing 34 and has its open end abutting the cover 32 and its closed end abutting the cover 31, a second cup-shaped valve 36 being fitted rotatably within the outer valve 35 and having its open end abutting the cover 32 and its closed end abutting the closed end of the valve 35. The valves are concentric and arranged to oscillate relative to one another, and the open end of the inner valve 36 opens into the atmosphere by way of the exhaust port 33. A stem 37 is attached to the closed end of the inner valve 36 and projects through the closed end of the valve 35 and the cover 31, being provided upon its outer end with a radial arm 38 for oscillating the valves. Said arm 38 can be connected by any suitable means with a hand lever, handle or other operating member (not shown) for conveniently controlling the present device. The valves 35 and 36 have limited oscillatory movements relative to one another, and for this purpose, the closed end of the valve 35 has an arcuate slot 39 and the closed end of the valve 36 carries a pin 40 projecting into said slot.

The valves 35 and 36 control the flow of pressure fluid to and from the bushings or secondary cylinders 17 and 18, and for this purpose, the bushing 34 has an arcuate series of ports 41, 42, 43 and 44, the bushing 18 has ports 45 and 46 adjacent to its opposite ends, the bushing 17 has ports 47 and 48 adjacent to its opposite ends, and the cylinder or cylinder casting 13 has passages 49, 50, 51 and 52 establishing communication between the ports 41, 42, 43 and 44 and ports 45, 46, 47 and 48, respectively. The ports 46 and 47 are arranged adjacent to the partition 16 while the ports 45 and 48 are arranged adjacent to the remote ends of the bushings 17 and 18. The valve 35 has a port 53 adapted to register in succession with the ports 41, 42, 43 and 44, and the periphery of said valve is provided with an arcuate groove 54 having its ends extending near but terminating short of the port 53. When the port 53 is in registration with one of the ports 41, 42, 43 and 44, the groove 54 is in registration with the other of said ports. The periphery of the inner valve 36 has a port 55 to register with the port 53 in the periphery of the valve 35. When the pin or lug 40 is at one end of the slot 39, the port 55 registers with the port 53, and when the pin 40 is at the other end of the slot 39, said ports are out of registration, as seen in Fig. 1. The valve casing 30 is provided with a radial nipple 56 providing a pressure fluid inlet port registering with a port 57 with which the bushing 34 is provided in continuous communication with the groove 54. A pressure fluid supply pipe 58 is connected by a union or other suitable connection with the nipple 56.

Supposing the port 53 to be between the ports 41 and 42, the groove 54 will then register with all of the ports 41, 42, 43 and 44, whereby the pressure fluid can flow into the cylinder bushings 17 and 18 at both ends thereof. Thus, pressure fluid can flow from the nipple 56 through the port 57 into the groove 54, and thence through the ports 41, 42, 43 and 44 into the passages 49, 50, 51 and 52, respectively, then flowing through the ports 45, 46, 47 and 48, respectively, into the opposite ends of the bushings 17 and 18.

This equalizes the pressure at the opposite sides of the pistons, to hold them in neutral or intermediate position, assisted by the springs 29. Now, when the valve 36 is rotated counter clockwise as seen in Fig. 1, the port 55 is brought into communication with the port 53, the pin 40 then striking one end of the slot 39, so that the valve 35 is turned with the valve 36. The ports 53 and 55 first register with the port 42, which brings the port 46 into communication with the exhaust port 33, and the pressure fluid between the piston 22 and partition 16 will be forced out to the atmosphere by the live pressure fluid between the piston 22 and cylinder head 15. Thus, pressure fluid can flow from between the piston 22 and partition 16 by way of the port 46, passage 50, port 42, port 53, chamber of valve 36, and port 33 to the atmosphere. At the same time, the groove 54 registers with the ports 41, 43 and 44 to supply pressure fluid in both ends of the bushing 17 and the outer end of the bushing 18, so that the piston 22 will be moved to the right, as seen in Fig. 1, thus bringing the gear wheel 3 into mesh with the gear wheel 10, to provide first or low speed. Then, by turning the valve 36 farther to bring the port 53 into communication with the port 43, the groove 54 is now brought into communication with the port 42, so that the piston 22 will be returned to intermediate position, and the pressure fluid can now flow to the atmosphere from between the piston 19 and partition 16 by way of the port 47, passage 51, ports 43, 53 and 55, chamber of valve 36 and port 33. The groove 54 registering with the port 44 will still permit pressure fluid to flow into the bushing 17 by way of the port 48, and this will cause the piston 19 to be moved to the left, as seen in Fig. 1, to bring the gear wheel 4 into mesh with the gear wheel 9, to provide second or intermediate speed. Should the valve 36 be turned still farther, the port 53 is brought into communication with the port 44, whereby the groove 54 is brought into communication with the port 43 to permit pressure fluid to flow between the piston 19 and partition 16 by way of the port 47, while the port 48 is brought into communication with the atmosphere by way of the passage 52, ports 44, 53 and 55, chamber of valve 36, and port 33. The piston 19 will therefore be moved to the right, as seen in Fig. 1, to move the clutch hubs 8 into engagement, to provide third or high speed. Then, by turning the valve 36 in the opposite direction, clockwise as seen in Fig. 1, the pin 40 in moving in the slot 39 will permit the port 53 to move out of registration with the port 55, and then when the pin 40 strikes the respective end of the slot 39, the valve 35 will be turned with the valve 36. The valves can thus be turned to normal position to bring the port 53 between the ports 41 and 42, and it will be noted that during this return movement of the valves, the valve 36 closes the port 53, and prevents the exhaust of pressure fluid so that the pistons 19 and 22 remain substantially in intermediate position. By turning the valve 36 properly, the ports 53 and 55 can be brought into registration with the port 41, to permit the pressure fluid to exhaust from between the piston 22 and head 15, whereby the piston 22 will be moved to the left, as seen in Fig. 1, by pressure fluid flowing from the groove 54 through the port 46 between the piston 22 and partition 16. The stem 23 will therefore be moved to bring the gear wheel 3 into mesh with the gear wheel 11, for providing a reverse speed.

It will be noted that ordinarily, the pressure fluid is admitted into the opposite ends of the bushings or secondary cylinders 17 and 18, to equalize the pressure on the opposite sides of the pistons, and the valves are operable for permitting pressure fluid to discharge from one side of one piston, so that said piston follows the discharge of pressure fluid, and operates the transmission gearing accordingly. The various speeds can be provided in succession, and there being pressure against the opposite sides of the pistons under normal conditions, the exhaust of pressure fluid from one side of one piston will immediately bring it into operation for shifting the transmission gearing.

Having thus described the invention, what is claimed as new is:

1. A device of the character described comprising a cylinder having heads, a partition within the cylinder between its ends, a piston working within the cylinder between said partition and one head and having a tubular stem passing slidably through said head, a piston working in the cylinder between the partition and other head and having a stem projecting slidably through said partition and tubular stem, and means for controlling the flow of pressure fluid into and out of the cylinder at opposite sides of said partition.

2. A device of the character described comprising a cylinder having heads, a partition within the cylinder between its ends, a piston working within the cylinder between said partition and one head and having a tubular stem passing slidably through said head, a piston working in the cylinder between the partition and other head and having a stem projecting slidably through said partition and tubular stem, spring means for holding each piston in intermediate position between the partition and respective head, the cylinder having ports at its remote ends and ports adjacent to and at the opposite sides of the partition, and means for controlling the flow of pressure fluid through said ports into and out of the cylinder.

3. A device of the character described embodying a cylinder having heads, a partition fitted in the cylinder between its ends, bushings fitted in the cylinder between the partition and heads, a piston slidable in one bushing and having a tubular stem slidable through the respective head, a piston slidable in the other bushing and having its stem sliding through the partition and tubular stem, and means for controlling the flow of pressure into and out of the bushings.

4. A device of the character described embodying a cylinder having heads, a partition fitted in the cylinder between its ends, bushings fitted in the cylinder between the partition and heads, a piston slidable in one bushing and having a tubular stem slidable through the respective head, a piston slidable in the other bushing and having its stem sliding through the partition and tubular stem, expansion springs between each piston and the partition and respective head to hold the piston in intermediate position, the bushings having ports at their opposite ends, and means for controlling the flow of pressure fluid through said ports.

5. A device of the character described embodying a cylinder, a piston working therein, means tending to move the piston to intermediate position, the cylinder having ports at opposite sides of the piston, and a valve structure having ports communicating with the aforesaid ports, a pressure fluid inlet port and an exhaust port, the valve structure having means when in one position for bringing both of the second mentioned ports into communication with one of the last two mentioned ports, and when in another position, to bring one of the second mentioned ports into communication with the other of the two last mentioned ports, the valve structure also having relatively movable parts, one to operate said valve structure and the other to stop the flow when the aforesaid part is moved in one direction.

6. A device of the character described embodying a cylinder, a piston working therein, means tending to move the piston to intermediate position, and a valve structure having a pair of ports communicating with the cylinder at opposite sides of the piston, an inlet port, an exhaust port, the valve structure having a valve provided with means for bringing one or both of said pair of ports into communication with one of the two last mentioned ports, and the valve having means whereby when it is moved to certain positions it can bring either of said pair of ports into communication with the other of the two last mentioned ports, and means coöperable with and movable relatively to the valve for stopping the flow when the valve is moved in one direction.

7. A device of the character described embodying a cylinder, a piston therein, means tending to move the piston to intermediate position, a valve casing having a pair of ports communicating with the cylinder at opposite sides of the piston, an inlet port and an exhaust port, a valve having a port registerable with either of said pair of ports, and means communicating with one of the two last mentioned ports and adapted to register with either or both of said pair of ports, and a second valve having limited movement relative to the first mentioned valve, the second valve when moved in one direction closing the port of the first mentioned valve and having a port to register with the port of the first mentioned valve when the second valve is moved in the other direction to bring the port of the first mentioned valve into communication with the other of the said two last mentioned ports of the valve casing.

8. A device of the character described embodying a cylinder, a piston working therein, means tending to move the piston to intermediate position, a valve casing having a pair of ports communicating with the cylinder at opposite sides of the piston, an inlet port and an exhaust port, an oscillatory valve within the valve casing having a port to register with either of said pair of ports and an arcuate groove registering with one of the two last mentioned ports of the valve casing and with either or both of said pair of ports, and a second oscillatory valve assembled with the first mentioned oscillatory valve and having a port communicating with the other of the two last mentioned ports of the valve casing, the second valve having limited movement relative to the first mentioned valve to bring its port into and out of registration with the port of the first mentioned valve.

9. A device of the character described embodying a cylinder, a piston therein, means tending to move the piston to intermediate position, a valve casing having a pair of ports communicating with the cylinder at opposite sides of the piston, an inlet port, and an exhaust port, a cup-shaped valve mounted for oscillation in the valve casing with its open end adjacent to the exhaust port, said valve having a port to register with either of said pair of ports, and an arcuate groove registering with the inlet port and adapted to register with either or both of said pair of ports, and a second cup-shaped valve mounted for oscillation within the first mentioned valve with its closed end fitting the closed end of the first mentioned valve and its open end communicating with the exhaust port, the second valve having limited oscillatory movement relative to the first mentioned valve and having a port adapted to move into and out of registration with the port of the first mentioned valve, and a stem attached to the closed end of the second valve and projecting through the closed end of the first mentioned valve and valve casing.

In testimony that I claim the foregoing as my own, I have hereto affixed my signature in the presence of two witnesses.

GEORGE M. RILEY.

Witnesses:
J. M. HUNTER,
ALBERT T. HOELIN.